United States Patent [19]

Ueyema et al.

[11] Patent Number: 5,155,715
[45] Date of Patent: Oct. 13, 1992

[54] REPRODUCING APPARATUS

[75] Inventors: Tetsuo Ueyema, Nara; Hideaki Sato, Koriyama; Kenji Ohta; Shozou Kobayashi, both of Nara, all of Japan

[73] Assignee: Sharp Kabushiki Kaisha, Osaka, Japan

[21] Appl. No.: 464,414

[22] Filed: Jan. 12, 1990

[30] Foreign Application Priority Data

Jan. 13, 1989 [JP] Japan .................. 1-7107

[51] Int. Cl.⁵ .................. G11B 7/00; H01J 5/16; G01N 23/00
[52] U.S. Cl. .................. 369/44.11; 369/44.26; 250/227.27; 250/307
[58] Field of Search .............. 369/44.11, 44.15, 44.16, 369/44.26, 117, 101, 120, 126; 250/306, 307, 310, 227.19, 227.27, 492.2

[56] References Cited

U.S. PATENT DOCUMENTS

| | | | |
|---|---|---|---|
| 4,575,822 | 3/1986 | Quate | 365/174 |
| 4,660,187 | 4/1987 | Yoshino et al. | 369/13 |
| 4,829,507 | 5/1989 | Kazan et al. | 369/126 |
| 4,947,042 | 8/1990 | Nishioka et al. | 250/306 |
| 5,017,010 | 5/1991 | Mamin et al. | 250/227.19 |
| 5,047,649 | 9/1991 | Hodgson et al. | 250/307 |
| 5,051,379 | 9/1991 | Bayer et al. | 250/306 |
| 5,065,103 | 11/1991 | Slinkman et al. | 250/306 |

FOREIGN PATENT DOCUMENTS 247219 12/1987 European Pat. Off. .
272935 6/1988 European Pat. Off. .
2182480 5/1987 United Kingdom .

OTHER PUBLICATIONS

G. Binning, H. Hohrer, Ch. Gerber and E. Weibel, "Surface Studies By Scanning Tunneling Microscopy", Physical Review Letters, vol. 49, No. 1, Jul. 5, 1982, pp. 57–61.

T. R. Albrecht and C. F. Quate, "Atomic Resultuio nImaging of A Nonconductor By Atomic Force Microscopy", J. Appl. Phys., vol. 62, No. 7, Oct. 1, 1987, pp. 2599–2602.

K. Kajimura, W. Mizutani and M. Ono, "Research and Development of STM", I.S.P.E. 53, Dec. 1987, pp. 1–6.

Primary Examiner—Roy N. Envall, Jr.
Assistant Examiner—Nabil Hindi
Attorney, Agent, or Firm—David G. Conlin; Henry D. Pahl, Jr.

[57] ABSTRACT

A reproducing apparatus for reproducing information from recording elements formed with very small pits on a planar surface. The reproducing apparatus includes a probing unit positioned at a very small distance apart from the surface of the recording element and a scanning unit for scanning the probing unit at a very small distance apart from the surface of the recording element. The reproducing apparatus also includes a detecting unit connected to the probing unit and the recording element respectively, for detecting interactions generated between the probing unit and the surface of the recording element and a regeneration unit connected to the detecting unit for inputting a signal output from the detecting unit and for regenerating information by detecting a pattern of the pits by the input signal.

13 Claims, 4 Drawing Sheets

REPRODUCING APPARATUS

BACKGROUND OF THE INVENTION

1. Field of the Invention

The present invention relates to a reproducing apparatus for reproducing information from recording elements on whose planar surfaces are formed very small pits.

2. Description of the Related Art

There is a magnetic reproducing apparatus for recording information in magnetization direction with respect to a magnetic recording medium by means of a magnetic head and for reproducing information by detecting the magnetization direction by means of the magnetic head. Applicants know an optical reproducing apparatus for recording information from pits with minor irregularities formed on the surface of a substrate and for reproducing information by a method in which the pits are radiated with light beams and the presence of pits is detected by variations in the intensity of the reflected light. The Applicants also know a photo-magnetic reproducing apparatus for arranging portions having a fixed magnetization direction in a recording medium (recording bits) and for reproducing information by a method in which a recording medium is radiated with light beams and the arrangement of the recording bits is detected by variations in the polarization direction of the reflected light.

The above-mentioned reproducing apparatuses have problems in that their ability to read out a magnetic head or light beams is limited, and the recording density cannot be increased markedly since pits and recording bits have a length measured in submicrons at the minimum.

SUMMARY OF THE INVENTION

An object of the present invention is to provide a reproducing apparatus capable of reproducing information from recording elements having a high recording density.

The object of the invention can be achieved by a reproducing apparatus for reproducing information from recording elements formed with very small pits on a planar surface. The reproducing apparatus has an electric probing unit positioned at a very small distance apart from the surface of the recording element such that a tunnel effect takes place at the surface. A scanning unit scans the probing unit over the surface of the recording element and a detecting unit is connected to the probing unit and the recording element respectively, for detecting interactions generated between the probing unit and the surface of the recording element. A regeneration unit is connected to the detecting unit for inputting a signal output from the detecting unit and for regenerating information by detecting a pattern of the pits by the input signal Preferably, the signal input to the regeneration unit is generated by the interactions between atoms of the probing unit and atoms of the recording element, and the signal input indicates the displacement of the probing unit.

The reproducing apparatus further includes a voltage detecting unit connected to the probing unit and the regeneration unit respectively.

The probing unit is preferably a probe-head.

The detecting unit is a tunnel-current detector preferably.

The probing unit may include an actuator having a plurality of driving parts capable of driving the probing unit in a plurality of directions.

The probing unit furthermore includes a servo-circuit.

Preferably, the actuator has an X-axis driving part capable of driving the probing unit in the X-direction and a Y-axis driving part capable of driving the probing unit in the Y direction.

The actuator may have an X-axis driving part capable of driving the probing unit in the X direction, a Y-axis driving part capable of driving the probing unit in the Y direction and a Z-axis driving part capable of driving the probing unit in the Z direction.

Preferably, the actuator has a Z-axis driving part capable of driving the probing unit in the Z direction, a X-axis driving part capable of driving the probing unit in the X direction and a Y-axis driving part capable of driving the probing unit in the Y direction.

Each of the driving parts may includes a piezoelectric element.

The regeneration unit furthermore includes a filter unit for removing the background of the input signal.

The detecting unit is a laser interferometer having a Zeeman laser as a light source and a plurality of mirrors adapted to reflect a part of a light beam generated by the light source and to pass through a part of the light beam so as to detect the interactions between the probing unit and the surface of the recording element.

Preferably, the probing unit is mounted on a cantilever, and the laser interferometer is adapted to detect a phase variation of an interference of the light so as to measure a displacement of the cantilever.

According to the present invention, reproducing of pits formed with not only irregularities on the order of micrometer ($\mu$m) but irregularities on the order of nanometer (nm), and ultimately pits formed of one irregular atom is made possible, and therefore information can be produced by using recording elements having a recording density several digits more than that of the recording elements used in the related art.

The reproducing apparatus of the present invention reproduces information from recording elements on whose planar surfaces are formed pits with very small recesses and projections. It comprises an electric probe-head whose tip is acute, a scanning means for scanning with this probe-head a very small distance apart from the surface of the above-mentioned recording element such that a tunnel effect takes place at the surface, a detection means for detecting the interactions generated between atoms when the probe-head is a very small distance apart from the surface of the recording element and a regeneration means for regenerating information by detecting the pattern of arrayed pits with the above-mentioned irregularities by a signal from the detection means. Therefore, the present invention has the following advantages: reproducing of pits formed with not only irregularities on the order of $\mu$m but irregularities on the order of nm, and ultimately pits formed of one irregular atom is made possible, and therefore information can be reproduced by using recording elements having a recording density several digits more than that of the recording element of the prior art.

Further objects and advantages of the present invention will be apparent from the following description of the preferred embodiments of the invention as illustrated in the accompanying drawings.

DETAILED DESCRIPTION OF THE PREFERRED EMBODIMENTS

One embodiment of the present invention will be explained hereinunder with reference to FIGS. 1 to 8.

Figure 1:
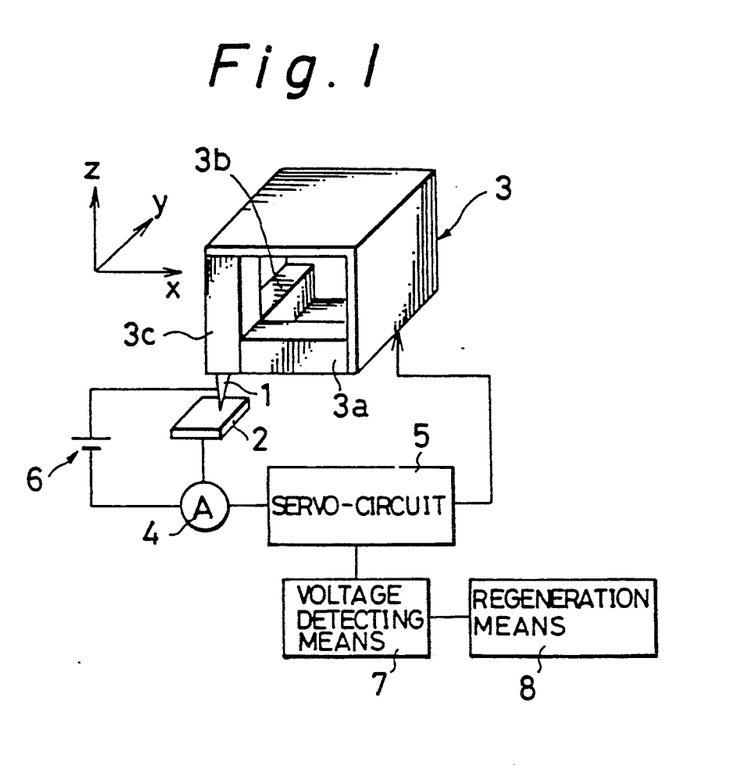
FIG. 1 is a schematic configurational view of a reproducing apparatus using the measurement principles of STM (Scanning Tunneling Microscope)

The reproducing apparatus of this embodiment utilizes the measurement principles of a scanning tunneling microscope (STM). As shown in FIG. 1, it uses a metallic material as a probe-head 1, a conductive material as a recording element 2, and utilizes a tunnel-current generated between atoms on the probe-head 1 and the recording element 2 when the probe-head 1 is a very small distance apart from the recording element 2. The surface of the recording element 2 has a planar form and on this planar surface pits with recesses and projections are arrayed in a fixed direction at an atomic level. For the probe-head 1, the tip of a metallic wire made of metallic atoms Pt, W, Ir, or Au 1 to 0.01 mm or thereabouts in diameter electrolytically polished or mechanically polished and machined to a tip of 0.1 μm in radius is used. On the tip of the probe-head 1 are furthermore small irregular atoms, and several of the most protruding of these irregular atoms form the actual probe-head. The probe-head 1 is so disposed that it can move a very small distance by means of a three-dimensional actuator 3 in a Z direction which is axial of the probe-head 1, in a X direction which is perpendicular to this Z direction and in a Y direction which is perpendicular to the Z and X directions respectively. The three-dimensional actuator 3 comprises a X-axis driving part 3a for driving in the X direction, a Y-axis driving part 3b for driving in the Y direction and an X-axis driving part 3c for driving in the Z direction. The driving parts 3a, 3b and 3c are formed of piezoelectric element which expand and contract in response to an applied voltage.

The probe-head 1 is connected with a voltage applying means 6 which is connected to the recording element 2 via a tunnel-current detector 4 as a detecting means. The tunnel-current detector 4 is so arranged that it can detect interactions generated between atoms of the probe-head 1 and the atoms of recording element 2 when the probe-head 1 is a very small distance apart from the recording element 2. The tunnel-current detector 4 is connected with a servo-circuit 5 which is arranged to control the voltage applied to the three-dimensional actuator 3 on the basis of the output from the tunnel-current detector 4. A scanning means comprises the three-dimensional actuator 3 and the servo-circuit 5, and is arranged to scan with the probe-head 1 a very small distance apart from the recording element 2.

The servo-circuit 5 is connected with a voltage detecting means 7 which picks up variations in a voltage applied to the three-dimensional actuator 3, and the voltage detecting means 7 is connected to a regeneration means 8. The regeneration means 8 is arranged so as to regenerate information by detecting variations in irregularities formed on the surface of the recording element 2 by the input of a signal from the tunnel-current detector 4, which is a detecting means, via the servo-circuit 5 and the voltage detecting means 7, namely, on the basis of a voltage variation picked up by the voltage detecting means 7.

In the above-mentioned arrangement, the distance between the probe-head 1 and the recording element 2 can be adjusted to 1 nm or thereabouts by applying a voltage of 1 V between the probe-head 1 and the recording element 2 by means of the voltage applying means 6 and by driving the probe-head 1 by the Z-axis driving part 3c, with the result that a tunnel-current $J_T$ flows by quantum effect. The tunnel-current $J_T$ is very sensitive to a variation in the distance between the probe-head 1 and the recording element 2. To keep the tunnel-current $J_T$ constant, a voltage applied to the Z-axis driving part 3c is controlled by the servo-circuit 5 to drive the probe-head 1 in the Z direction, and while the distance between the probe-head 1 and the recording element 2 is kept constant, the probe-head 1 is made to scan by the X-axis driving part 3a and the Y-axis driving part 3b in the X and Y directions. At this time, the variations in a voltage applied to drive the Z-axis driving part 3c is picked up by the voltage detecting means 7. The input of the picked-up signal to the regeneration means 8 enables the pattern of arrayed pits formed of irregularities on the surface of the recording element 2 to be detected and that information is reproduced.

When irregularities on the recording element 2 are detected by using tunnel effects as described above, resolution of about $10^{-3}$ nm ($10^{-2}$ Å) in the vertical direction and about $10^{-1}$ nm in the horizontal direction can be obtained. Ultimately, the reproduction using the recording element 2 having a high density in which individual irregularities of atoms are made pits, can be formed. In the above-mentioned embodiment, reproduction in a current constant mode in which tunnel-current $J_T$ is kept constant is described. However, when the surface of the recording element 2 is extremely planar and formed of only irregularities at an atomic level, the reproduction may be performed by a variable current mode such that a tunnel-current $J_T$ is detected while scanning with the probe-head 1 in the X and Y directions and variations in the tunnel-current $J_T$ are directly detected as the change in the distance between the probe-head 1 and the recording element 2; i.e., irregularities are detected without performing such control of keeping constant the distance between the probe-head 1 and the recording element 2. This obviates the control of driving the probe-head 1 by tracking individual irregularities, and therefore the reproduction is made possible at a higher speed than that in the above-mentioned current constant mode.

Figure 2:
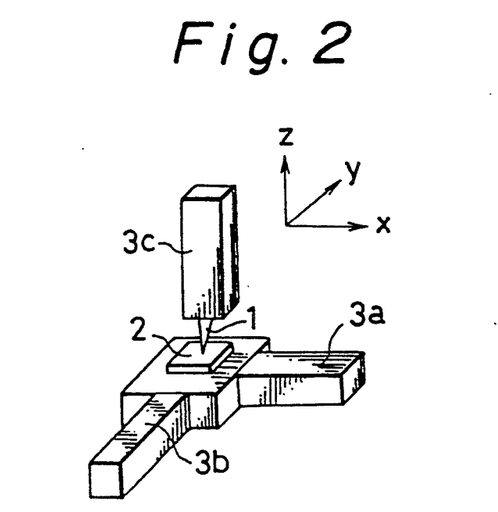
FIG. 2 is an explanatory view of one embodiment of the present invention in which a recording element is moved two-dimensionally while a probe-head is moved one-dimensionally.
Figure 3:
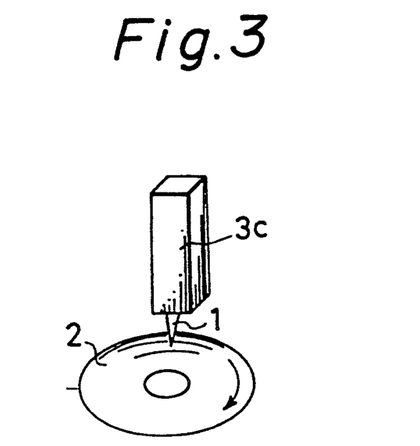
FIG. 3 is an explanatory view illustrating another embodiment of the present invention in which recording element is formed in the shape of a disk and is rotatable.
Figure 4:
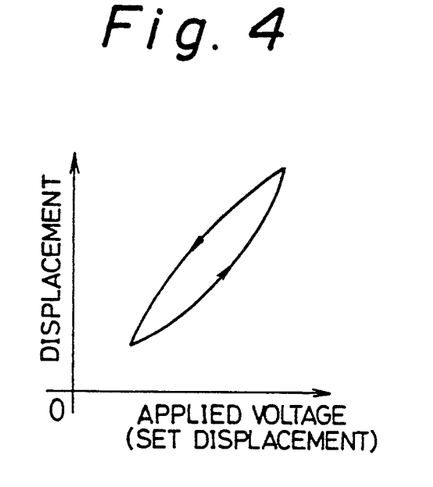
FIG. 4 is a graph illustrating the displacement of a piezoelectric element used in the driving parts with respect to an applied voltage.
Figure 5:
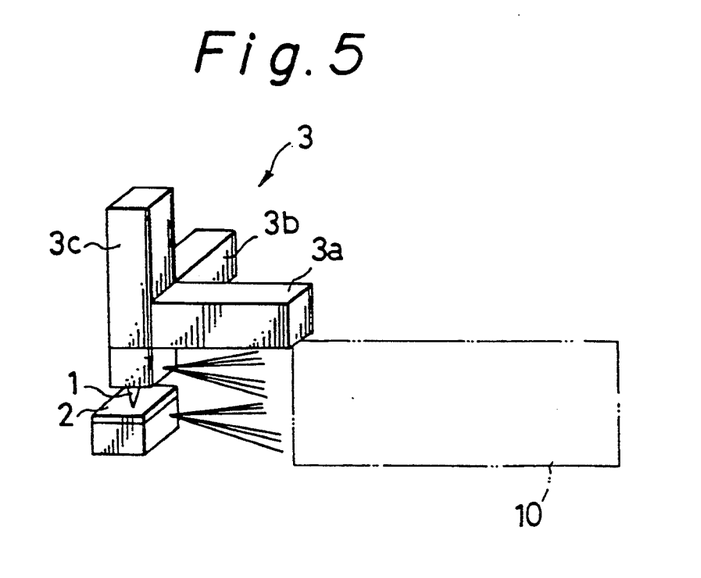
FIG. 5 is a graph illustrating the displacement of a piezoelectric element used in the driving parts with respect to a set voltage by feedback control.
Figure 6:
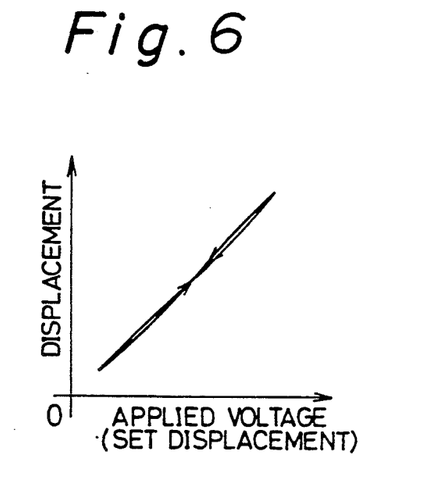
FIG. 6 is an explanatory view illustrating one embodiment of the present invention in which the position control in a horizontal direction in a probe-head is performed by means of a laser interferometer.

As shown in FIG. 2, it may be arranged that the probe-head 1 is moved by the Z-axis driving part 3c in the Z direction on one hand and a table on which the recording element 2 is deposited is moved by the X-axis driving part 3a and the Y-axis driving part 3b in the X and Y directions on the other hand. Further, as shown in FIG. 3, it may be arranged that the recording element 2 is formed in a disk form and trains of pits are formed in a volute or concentric circle form, and while the disk-like recording element 2 is rotated, the position of reproduction is gradually shifted. The method of driving the recording element 2 can be applied to both the variable current mode and the current constant mode. In the above-mentioned reproducing apparatus, the control of the distance between the probe-head 1 and the recording element 2, i.e., the positional control in the Z direction of the probe-head 1, is made by detecting the tunnel-current $J_T$. However, it has the drawback that reliability of tracking is low, since tracking by the probe-head 1 in the lateral direction (in the X or Y direction) is made only by applying a voltage to the X-axis driving part 3a and the Y-axis driving part 3b, and therefore, an actual movement is not confirmed. In other words, as shown in FIG. 4, the applied voltage-displacement characteristics of a piezoelectric element constituting each of the driving parts 3a, 3b and 3c have hysteresis, thereby causing an error. To solve this error, lateral position control in the probe-head 1 is made by a laser interferometer. That is, as shown in FIG. 5, to measure a relative distance between the probe-head 1 and the recording element 2, laser beams are irradiated toward a table on which a supporting section of the probe-head 1 and the recording element 2 are deposited. Its interference light is obtained and while the position of the probe-head 1 is detected, a voltage applied to a piezoelectric element is set by performing feedback control. As a result, the piezoelectric element can be displaced linearly and the probe-head 1 (or the recording element 2) can be positioned accurately in a lateral direction on the order of nanometer (nm), as shown in FIG. 6. A specific arrangement of the laser interferometer 10 will be described in detail in other embodiments to be mentioned later.

Figure 7A:
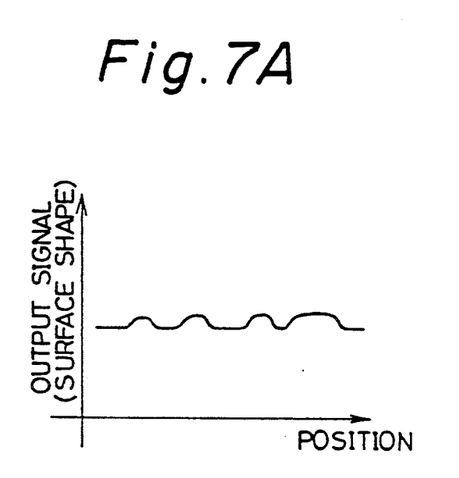
FIGS. 7A and 7B are graphs of illustrating the change in an output signal (surface shape) with respect to the movement of the probe-head.
Figure 7B:
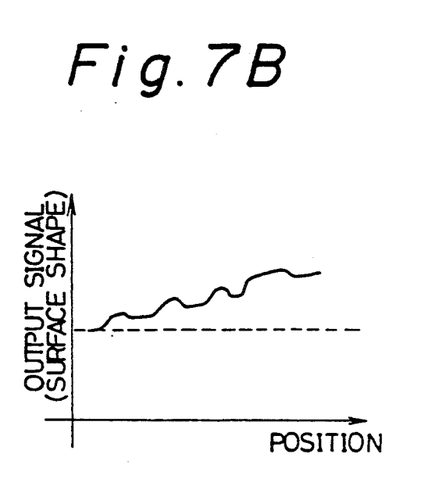

In cases where there is no undulation on the surface of the recording element 2, and the recording element 2 is positioned not on an inclination as shown in FIG. 7A, a regeneration signal shows the same waveforms as that of the irregularities formed on the recording element 2. When there are undulations on the recording element 2, or the recording element 2 is positioned on an inclination as shown in FIG. 7B, components of the undulation and inclination are contained in a regeneration signal. However, the frequency of the above-mentioned components of the undulation or inclination is three digits smaller than that of a regeneration signal of irregularities, on account of which the components of the undulation or inclination can be eliminated by making them pass through a high-pass filter.

Figure 8:
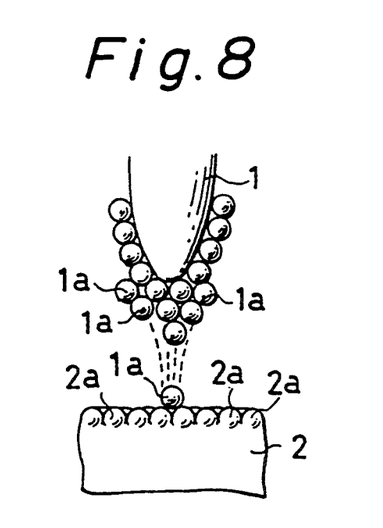
FIG. 8 is an explanatory view of a recording method in which information is recorded from pits formed with irregular individual atoms.

In the above explanation, the reproduction of pits due to irregularities on the surface of the recording element 2 is explained. Recording of pits using a device shown in FIG. 1 is also possible. To be specific, as shown in FIG. 8, the operation such that one atom 1a, constituting the tip of the probe-head 1, is added to any position on the recording element 2, or any one of atoms 2a on the recording element 2, is removed, is performed by employing an electric-field evaporation process which is considered to be the ultimate in refinement process technology. The tip of the probe-head 1 is brought into an unstable state and atoms are electric-field evaporated as positive ions from the anode side and attached on the cathode side (the reverse is true of the case of negative ions), with the result that pits can be recorded by means of individual irregularities of atoms.

Another embodiment of the present invention will be explained hereinunder with reference to FIGS. 9 and 10. Those members having the same functions as that of the above-mentioned embodiment are given the same reference number, and the explanation is omitted.

The reproducing apparatus of the present invention uses the measurement principles of an atomic force microscope (AFM).

Figure 9:
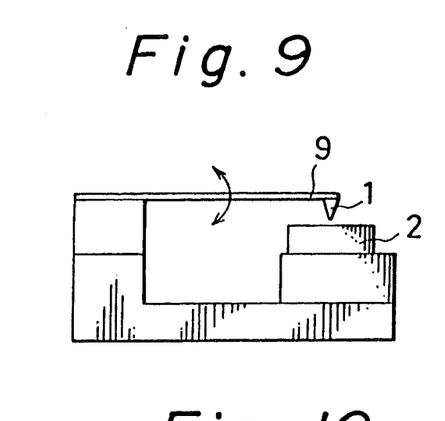
FIG. 9 is a schematic configurational view of one embodiment of the present invention using the measurement principles of AFM (Atomic Force Microscope)
Figure 10:
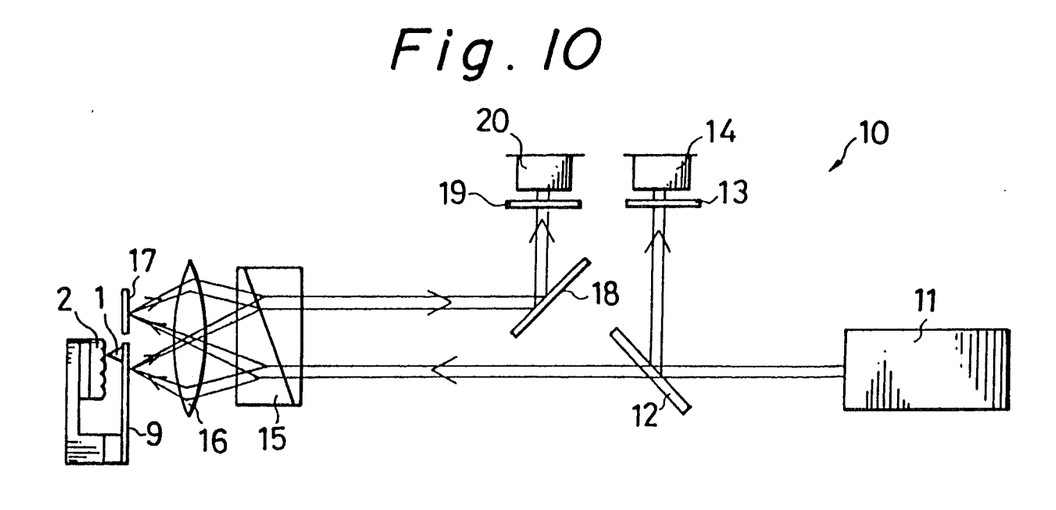
FIG. 10 is a schematic configurational view of a laser interferometer used in the present invention for detecting the displacement of a cantilever.

As shown in FIG. 9, to detect the atomic force between the atoms on the tip of the probe-head 1 and the atoms on the surface of the recording element 2, the probe-head 1 is supported by means of the cantilever 9. The cantilever 9 is so arranged that it receives a repulsion or an attraction generated when the probe-head 1 is placed close to the recording element 2 and is elastically deformed easily. The atomic force is detected by the elastic deformation of the cantilever 9. While the position of the probe-head 1 is adjusted so as to keep the atomic force constant, the probe-head 1 is made to scan and the irregularities on the surface of the recording element 2 are detected in the same manner as in the above-mentioned embodiment. According to this embodiment, conductive materials do not need to be used as the probe-head 1 and the recording element 2, and use of insulating materials or the like is made possible.

For the measurement of the displacement of the cantilever 9, for example, a laser interference method may be employed. As shown in FIG. 10, a laser beam of two-cycle cross linear polarized light is radiated from a Zeeman laser 11 in the laser interferometer 10. Part of this laser beam is reflected by a half-mirror 12 and the other part penetrates it. The resulting beams diverge in two different directions. One of the diverged beams of light enters a photo detector 14 via a polarizing plate 13. The other of the diverged light enters a Wollaston prism 15. The laser beam is divided into two components, different in frequency, intersecting each other at right angles. One of the divided beams of light penetrates a lens 16, after which it is reflected by the cantilever 9. The other divided light penetrates the lens 16, after which it is reflected by a reference mirror 17. After those reflections, the beams penetrate the lens 16 and are overlapped on the Wollaston prism 15. The interference light by this overlap is reflected by a reflection mirror 18, after which it enters a photo detector 20 via a polarizing plate 19 and a beat signal having the frequency of the difference between the two lights overlapped on the interference light is obtained. Since the phase of the beat signal is varied by the deformation of the cantilever 9, the amount of the displacement of the cantilever 9 can be measured by detecting the phase variation. The cantilever 9 and the laser interferometer 10 constitute a detecting means for detecting the interactions generated when the probe-head 1 is a very small distance apart from the surface of the recording element 2. The displacement of the cantilever 9 is the variation in irregularities on the recording element 2. Therefore, by picking up the amount of the displacement of the cantilever 9 as a voltage variation, a pattern of arrayed pits are detected by a regeneration means (not shown) and information is reproduced. According to this reproducing apparatus, piezoelectric elements or the like shown in the above-mentioned embodiment can be used as a scanning means of the probe-head 1 and the recording element 2. The shape of pits are not needed to be measured accurately over the entire surface by making the number of the scanning lines large, as when the shape of the surface of a specimen is measured by STM or AFM, and the presence of pits can be detected by scanning one time per one pit train.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for reading recording pits recorded on a recording medium, comprising:

probing means for detecting a tunnel current;

scanning means having a plurality of first piezoelectric elements for scanning said probing means over a surface of said recording medium element in different directions, relatively;

a tunnel current detecting means for detecting a tunnel current flowing between said probing means and said recording pits on said recording medium;

a servo-circuit having a second piezoelectric element for driving said probing means in a direction transverse to said surface and for maintaining a preselected distance between said probing means and said surface of said recording medium so as to keep the value of said tunnel current essentially constant;

means for transforming an output value of an electric voltage supplied to said second piezoelectric element by said servo-circuit into an information signal characterizing said surface of said medium; and means for controlling said scanning means by measuring a displacement of said probing means thereby to compensate for hysteresis in the electric voltage drive of said first piezoelectric element for scanning said probing means in said different directions.

2. A reproducing apparatus according to claim 1, wherein said servo-circuit is capable of maintaining said distance between said probing means and said surface of said recording medium so that low frequency components in said information signal are kept as a constant, and high frequency components in said information signal are corresponding to the character of the recording pits in said surface of said recording medium as said probing means is scanned in said different directions.

3. A reproducing apparatus according to claim 2, wherein said transforming means is capable of directly transforming high frequency components in a signal of said tunnel current into said information characterizing said surface of said medium.

4. A reproducing apparatus according to claim 1, wherein said transforming means further includes a high-pass filter capable of transforming high frequency components in values of said electric voltage output supplied to said second piezoelectric element into said information characterizing said surface of said medium.

5. A reproducing apparatus according to claim 1, wherein said controlling means includes a laser interferometer for measuring said displacement of said probing means, said laser interferometer having a Zeeman laser light source, a Wallaston prism and conversing lens, said laser interferometer being capable of detecting a displacement difference over a short distance in accordance with phase-difference variations of interference light paths.

6. A reproducing apparatus according to claim 5, wherein said laser interferometer further includes a plurality of mirrors adapted to reflect a part of a light beam generated by said light source and to pass through a part of said light beam so as to detect said displacement of said probing means.

7. A reproducing apparatus according to claim 1, wherein said probing means is a probe-head, and said first piezoelectric element includes a X-axis driving part capable of driving said probing-head in the X direction and a Y-axis driving part capable of driving said probing-head in the Y direction in a rectangular coordinate system.

8. A reproducing apparatus according to claim 1, wherein said second piezoelectric element includes a Z-axis driving part capable of driving said probing-head in the Z direction in a rectangular coordinate system.

9. An apparatus for reading recording pits recorded on a recording medium, comprising:

a cantilever for detecting an interaction force between atoms, said cantilever including:

a probing means mounted on an end point of said cantilever;

scanning means having a first piezoelectric element for scanning said probing means over a surface of said recording medium in different directions, relatively;

a laser interferometer for measuring a displacement of said cantilever;

a servo-circuit having a second piezoelectric element for driving said probing means in a direction transverse to said surface and for maintaining a preselected distance between said probing means and said surface of said recording medium;

means for transforming an output value of an electric voltage supplied to said second piezoelectric element into information characterizing said surface of said medium; and means for controlling said probing means to be driven linearly by measuring a displacement of said probing means in accordance with said laser interferometer so as to compensate for hysteresis in the electric voltage drive of said first piezoelectric element for scanning said probing means in said different directions.

10. A reproducing apparatus according to claim 9, wherein said laser interferometer includes a Zeeman laser light source, a Wallaston prism and conversing lens, said laser interferometer being capable of detecting a displacement difference over a short distance in accordance with phase-difference variations of interference light paths.

11. A reproducing apparatus according to claim 10, wherein said laser interferometer further includes a plurality of mirrors adapted to reflect a part of a light beam generated by said light source and to pass through a part of said light beam so as to detect said displacement of said probing means.

12. A reproducing apparatus according to claim 9, wherein said probing means is a probe-head, and said first piezoelectric element includes a X-axis driving part capable of driving said probing-head in the X direction and a Y-axis driving part capable of driving said probing-head in the Y direction in a rectangular coordinate system.

13. A reproducing apparatus according to claim 9, wherein said second piezoelectric element includes a Z-axis driving part capable of driving said probing-head in the Z direction in a rectangular coordinate system.

* * * * *

UNITED STATES PATENT AND TRADEMARK OFFICE
CERTIFICATE OF CORRECTION

PATENT NO. : 5,155,715
DATED : October 13, 1992
INVENTOR(S) : Tetsuo Ueyama, et al It is certified that error appears in the above-indentified patent and that said Letters Patent is hereby corrected as shown below:

On title page Item No. 75, change "Ueyema" to --Ueyama--.

Signed and Sealed this

Twenty-sixth Day of October, 1993

Attest:

BRUCE LEHMAN

*Attesting Officer*  *Commissioner of Patents and Trademarks*